C. KNIPS & E. EY.
APPARATUS FOR GENERATING OZONE.
APPLICATION FILED SEPT. 7, 1910.
983,907.
Patented Feb. 14, 1911.
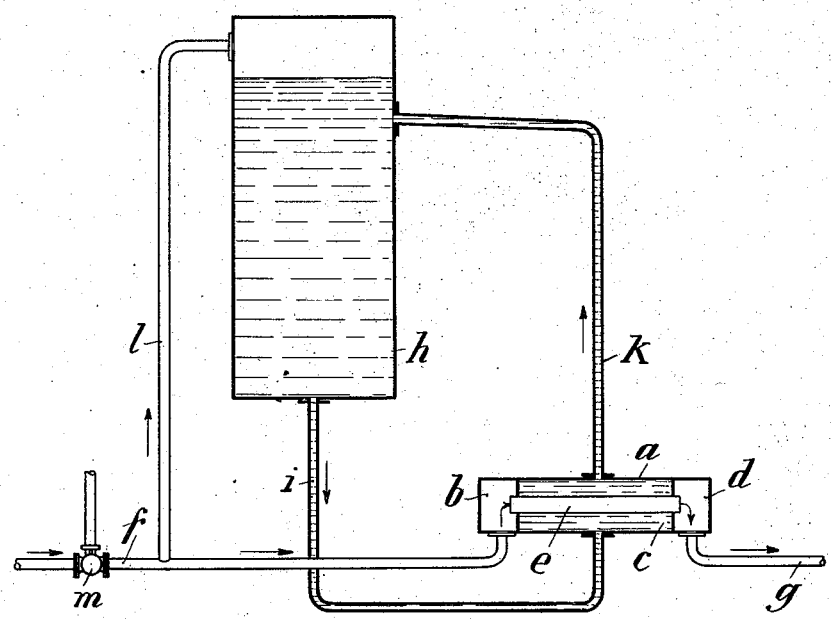
Witnesses
H. H. Knight
Ray T. Ernst
Inventors
Christoph Knips
and Eduard Ey
by their attorneys

UNITED STATES PATENT OFFICE.

CHRISTOPH KNIPS AND EDUARD EY, OF CHARLOTTENBURG, GERMANY, ASSIGNORS TO SIEMENS & HALSKE A. G., OF BERLIN, GERMANY, A CORPORATION OF GERMANY.

APPARATUS FOR GENERATING OZONE.

983,907.  Specification of Letters Patent. Patented Feb. 14, 1911.

Application filed September 7, 1910. Serial No. 580,884.

*To all whom it may concern:*

Be it known that we, CHRISTOPH KNIPS and EDUARD EY, subjects of the German Emperor and residing at Charlottenburg, near Berlin, Germany, have invented certain new and useful Improvements in Apparatus for Generating Ozone, of which the following is a specification.

Our invention relates to apparatus for generating ozone.

In recently designed apparatus for generating ozone the glass tubes, in which ozone is generated by the action of electrical discharges on air or pure oxygen, are cooled continuously by means of flowing water. The tubes as well as all the packing between the same and the air chamber and the collecting chamber for the ozonized gaseous mixture must take up the pressure in the pipe supplying air or oxygen. In recently designed plants this pressure frequently attains such a height that the glass tubes crack and the joints leak.

A primary object of our invention is to remedy this defect. To this end, we subject the ozone tubes and the packing between them and the ozone chamber to an equalizing pressure which can be increased until they are perfectly relieved. For this purpose we firstly arrange that the cool water flows in a closed conduit from a tank to the ozone apparatus. This tank is connected in such manner with the pipe supplying air or oxygen under pressure that it is impossible for water to overflow into this supply pipe, but the pressure in the pipe is imparted to the water in the tank. In order to prevent steam being carried over from the tank into the ozone apparatus we preferably connect the tank in parallel with the apparatus. Secondly, we connect the tank with the water chamber of the ozone apparatus in such manner that the water is able to circulate. By completely closing the apparatus from the atmosphere we first obtain perfect equalization of pressure for the ozone tubes and their packing, and, secondly, perfect circulation of the cool water owing to the differences in temperature; constant consumption of water for cooling the ozone apparatus is therefore avoided.

One illustrative embodiment of our invention is represented in sectional elevation in the accompanying drawing.

Referring to the drawing, $a$ designates an ozonizer having a compressed air pipe $f$ connected therewith, $b$ designates an air chamber, $c$ a cool water chamber and $d$ an ozonic mixture chamber. An ozone tube $e$ is so arranged in the water chamber $c$ that it connects the air chamber $b$ with the ozonic mixture chamber $d$, it being closed fluid-tight from the water chamber $c$. The air forced by an air-compressor through the pipe $f$ flows through the ozonizer in the direction indicated by the arrows and leaves it, enriched with ozone, through the pipe $g$ leading to the place where it is used. Now according to our invention we provide a water tank $h$ connected in such manner by two pipes $i$ and $k$ with the water chamber $c$ that when the plant is in operation the water is kept in constant circulation flowing from the tank through the pipe $i$ to the ozonizer where it is heated and rises through the pipe $k$ to the tank $h$ where it is cooled again. We also connect the water tank in parallel with the compressed air pipe $f$ by a branch pipe $l$ opening into the top part of the tank, that is above the water level, in order to prevent water overflowing into the supply pipe $f$. In this manner the pressure in the supply pipe is imparted to the cool water and so to the ozone tube $e$ and consequently relieves it perfectly. Further, we connect a three-way cock $m$ in the supply pipe $f$ in front of its branch $l$; by turning this cock to the left the pipe is connected with the atmosphere and consequently a complete fall of pressure is brought about in the entire plant, the ozone tube being perfectly relieved in this event also.

We claim:—

1. In apparatus for generating ozone, the combination with an ozonizer comprising an air chamber, a water chamber and an ozone tube passing through the water chamber into the air chamber; and a compressed air supply pipe connected with the air chamber, of a water tank, a pipe connecting the tank with the water chamber, and a pipe connecting the upper part of the tank with the air supply pipe.

2. In apparatus for generating ozone, the combination with an ozonizer comprising an air chamber, a water chamber and an ozone tube passing through the water chamber into the air chamber; and a compressed air supply pipe connected with the air chamber, of a water tank, a pipe connected with the bottom of the tank and with the water chamber, a return flow pipe connecting the water chamber with an upper part of the tank, and a branch pipe connecting the air supply pipe with the top part of the tank.

3. In apparatus for generating ozone, the combination with an ozonizer comprising an air chamber, a water chamber and an ozone tube passing through the water chamber into the air chamber; and a compressed air supply pipe connected with the air chamber, of a water tank, a pipe connected with the bottom of the tank and with the water chamber, a return flow pipe connecting the water chamber with an upper part of the tank, a branch of the air supply pipe connected with the top of the tank, and means in the air supply pipe for relieving the same and the parts connected therewith from pressure above atmospheric.

4. In apparatus for generating ozone, the combination, with an ozonizer comprising an air chamber, a water chamber and an ozone tube passing through the water chamber into the air chamber; and a compressed air supply pipe connected with the air chamber, of a water tank, a pipe connected with the bottom of the tank and with the water chamber, a return flow pipe connecting the water chamber with an upper part of the tank, a branch of the air supply pipe connected with the top of the tank, and a three-way cock in the air supply pipe in front of the branch thereof for connecting the same with the atmosphere.

In testimony whereof, we have signed our names to this specification in the presence of two witnesses.

CHRISTOPH KNIPS.
EDUARD EY.

Witnesses:
WOLDEMAR HAUPT,
ARTHUR SCHROEDER.